F. FEVOLA.
COMB CLEANER.
APPLICATION FILED APR. 8, 1908.
903,691.
Patented Nov. 10, 1908.
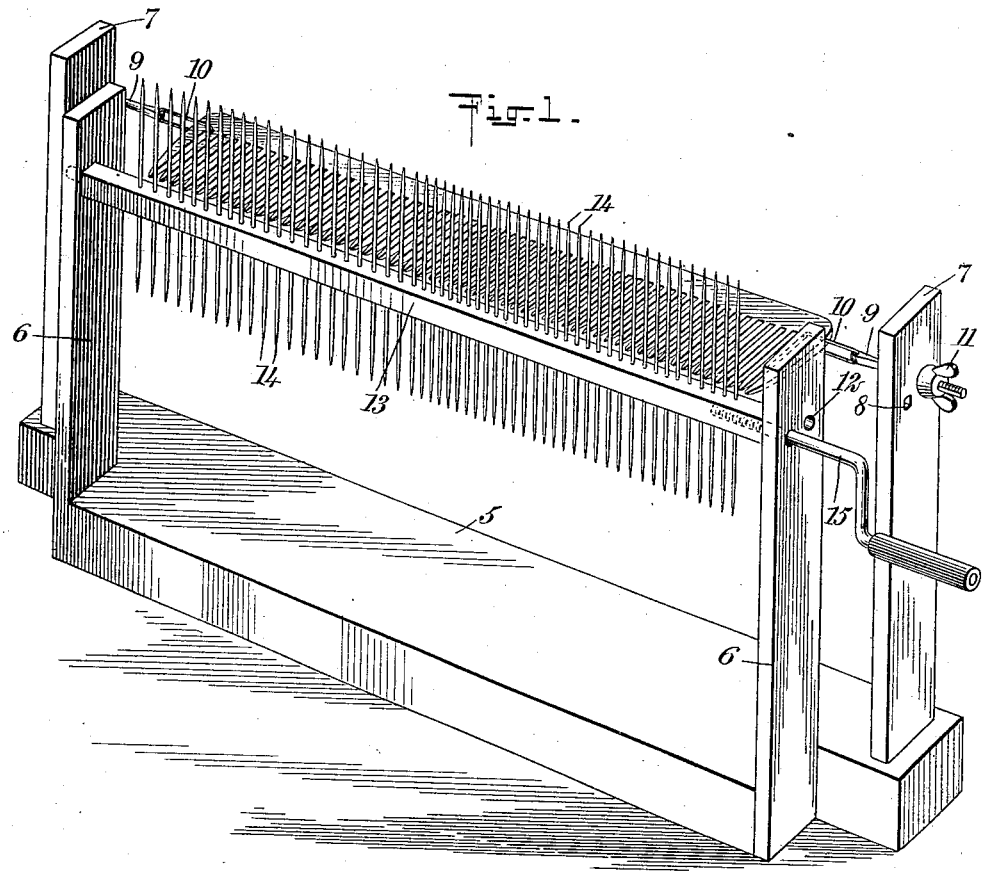
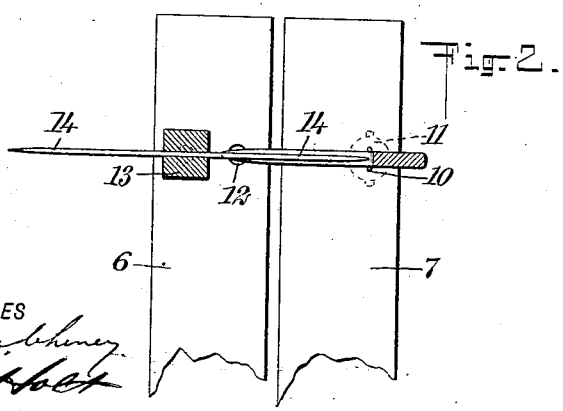
WITNESSES
INVENTOR
Frank Fevola
BY
ATTORNEYS
THE NORRIS PETERS CO., WASHINGTON, D. C.

UNITED STATES PATENT OFFICE.

FRANK FEVOLA, OF NEW YORK, N. Y.

COMB-CLEANER.

No. 903,691.

Specification of Letters Patent.

Patented Nov. 10, 1908.

Application filed April 8, 1908. Serial No. 425,962.

*To all whom it may concern:*

Be it known that I, FRANK FEVOLA, a citizen of the United States, and a resident of the city of New York, borough of Brooklyn, in the county of Kings and State of New York, have invented a new and Improved Comb-Cleaner, of which the following is a full, clear, and exact description.

This invention is an improvement in comb cleaning appliances, belonging to that class of such devices in which the cleaning member is revolved with respect to the comb.

The invention has in view the provision of means for engaging the opposite ends of the comb, and a member supported adjacent to said means and having teeth adapted to intermesh with the comb teeth when one or the other is revolved, the said member being interchangeable with other like members and laterally adjustable with respect to the comb in order that the device may be used in cleaning combs having the teeth of varying depths and spaced different distances apart.

Reference is to be had to the accompanying drawings forming a part of this specification, in which similar characters of reference indicate corresponding parts in both the views.

Figure 1 is a perspective view of the preferred form of my improved comb cleaner complete; and Fig. 2 is a cross-section of the same.

The invention embodies in its construction a suitable base 5 having spaced standards 6 and 7, respectively at each end, the standards 6 being preferably brought slightly closed together than the standards 7. Each standard 7 has a plurality of apertures 8 formed in its upper portion, alining with apertures in the opposite standard, which are adapted to slidably fit bolts 9 having loops 10 swiveled in their inner ends, the shanks of the bolts preferably being square or other angular form, as also the apertures 8, in order that the bolts may not turn. On the end of each bolt is threaded a thumb-nut 11, by which the distance between the loops 10 may be varied.

At approximately the same elevation as the apertures 8, each standard 6 is provided with a plurality of apertures 12, alining with corresponding apertures in the opposite standard, and in any set of which is adapted to be revolubly supported a tooth cleaning device consisting of a shaft 13 having teeth 14 radiating therefrom, these teeth being shown on two sides of the shaft and are spaced apart a distance equal to the distance between the teeth of the particular comb to be cleaned. The comb cleaning member is made interchangeable with the corresponding members, in order that combs may be cleaned having the teeth spaced different distances apart, for which purpose I thread or otherwise detachably fix upon one end of the shaft, a crank 15, by which the comb cleaning member is revolved. When the crank is detached, the shaft may be withdrawn from the supports and a similarly constructed shaft substituted having teeth of the required form and arrangement.

In the use of the appliance, the loops 10 are passed over the end teeth of the comb, as illustrated in Fig. 1, and the comb cleaning member revolved until these teeth are in contact with, or adjacent to, the teeth of the comb. The nuts 11 are then operated to shift the comb longitudinally until the teeth 14 exactly pass between the comb teeth, after which the nuts are tightened to retain the comb in a substantially fixed position. On now revolving the crank, the teeth 14 obviously remove the dandruff and other collections between the teeth of the comb. If the teeth 14 strike the comb teeth when the comb cleaning member is being revolved, the loops 10 yield slightly and prevent the breaking of any of the parts. The apertures 8 in the standards 7, and the apertures 12 in the standards 6, permit of the lateral adjustment of either the comb or the cleaning member, and adapt the cleaner to combs having teeth of varying depths.

Having thus described my invention, I claim as new and desire to secure by Letters Patent:

1. The combination of means for engaging over the teeth at the opposite ends of a comb and retaining the comb in a substantially fixed position, and a tooth-cleaning device revolubly mounted in working relation to said means.

2. The combination of means for supporting a comb at the ends, leaving that portion of the comb intermediate said ends unsupported, tooth-cleaning means mounted in working relation to the first mentioned means, and means for revolving one of said means.

3. The combination of a revoluble tooth cleaning device, means for engaging the comb at its opposite ends and retaining it adjacent to said device, and means for adjusting said device laterally relative to said means.

4. The combination of supports having loops for engaging over the outer teeth of a comb, means for adjusting said loops to and from each other, and a tooth cleaning device mounted at one side of the loops.

5. The combination of bolts having loops swiveled in their outer ends for engaging the outer teeth of a comb and retaining the latter in a substantially fixed position, and a tooth cleaning device revolubly mounted at one side of the loops.

6. The combination of means for retaining a comb in fixed position, and a member revolubly mounted at one side of said means having approximately rigid cleaning teeth adapted to intermesh with the teeth of the comb.

7. The combination of supporting means for a comb, adjustable longitudinally and laterally, and a member revolubly mounted at one side of said means, having cleaning teeth adapted to pass between the teeth of the comb.

In testimony whereof I have signed my name to this specification in the presence of two subscribing witnesses.

FRANK FEVOLA.

Witnesses:
W. W. HOLT,
JOHN P. DAVIS.